(12) United States Patent
Khan

(10) Patent No.: US 11,364,443 B2
(45) Date of Patent: Jun. 21, 2022

(54) SELECTION OF VIDEO WIDGETS BASED ON COMPUTER SIMULATION METADATA

(71) Applicant: Sony Interactive Entertainment LLC, San Mateo, CA (US)

(72) Inventor: Mohammed Khan, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 16/917,065

(22) Filed: Jun. 30, 2020

(65) Prior Publication Data

US 2021/0402308 A1    Dec. 30, 2021

(51) Int. Cl.
*A63F 13/86* (2014.01)
*A63F 13/87* (2014.01)
*A63F 13/79* (2014.01)
*A63F 13/497* (2014.01)

(52) U.S. Cl.
CPC ............ *A63F 13/86* (2014.09); *A63F 13/497* (2014.09); *A63F 13/79* (2014.09); *A63F 13/87* (2014.09)

(58) Field of Classification Search
CPC ........ A63F 13/497; A63F 13/86; A63F 13/79; A63F 13/87
See application file for complete search history.

(56) References Cited

U.S. PATENT DOCUMENTS

| | | | |
|---|---|---|---|
| 9,233,305 B2 | 1/2016 | Laakkonen et al. | |
| 9,266,017 B1 | 2/2016 | Parker et al. | |
| 10,230,866 B1 | 3/2019 | Townsend et al. | |
| 10,617,945 B1 | 4/2020 | George et al. | |
| 2009/0288014 A1* | 11/2009 | Fujioka | G06F 16/958 707/E17.014 |
| 2011/0053688 A1 | 3/2011 | Crawford et al. | |
| 2012/0100910 A1 | 4/2012 | Eichorn et al. | |
| 2013/0223818 A1 | 8/2013 | Wayans | |
| 2014/0031121 A1 | 1/2014 | Kern et al. | |
| 2014/0115477 A1 | 4/2014 | Pendergast et al. | |
| 2015/0141140 A1 | 5/2015 | Lampe et al. | |
| 2015/0251093 A1 | 9/2015 | Trombetta et al. | |
| 2017/0003784 A1* | 1/2017 | Garg | A63F 13/355 |
| 2017/0157512 A1 | 6/2017 | Long et al. | |
| 2017/0228600 A1 | 8/2017 | Syed et al. | |
| 2017/0270128 A1 | 9/2017 | Smith et al. | |
| 2018/0021684 A1 | 1/2018 | Benedetto | |
| 2018/0161675 A1 | 6/2018 | Miron et al. | |
| 2018/0316942 A1 | 11/2018 | Todd | |
| 2018/0316945 A1 | 11/2018 | Todd | |

(Continued)

FOREIGN PATENT DOCUMENTS

| | | |
|---|---|---|
| WO | 2009117105 A2 | 9/2009 |
| WO | 2016014724 A1 | 1/2016 |

OTHER PUBLICATIONS

"International Search Report and Written Opinion", dated Nov. 3, 2021 from the counterpart PCT application PCT/US21/39620.

(Continued)

*Primary Examiner* — Reginald A Renwick
(74) *Attorney, Agent, or Firm* — John L. Rogitz

(57) ABSTRACT

Computer game metadata is used to select a video widget provided in a video template. The widget can be operable to present metadata in the video template, change an association between features of the video template and metadata generated during play of a computer game, search for clips similar to a video clip presented by the video template, vary a length of a video clip presented by the video template, or vary an intensity of action used to select a video clip presented by the video template.

14 Claims, 14 Drawing Sheets

(56) References Cited

U.S. PATENT DOCUMENTS

| | | | |
|---|---|---|---|
| 2019/0351335 A1 | 11/2019 | Yong et al. | |
| 2019/0354765 A1 | 11/2019 | Chan et al. | |
| 2020/0147499 A1 | 5/2020 | Mahlmeister et al. | |
| 2020/0376380 A1* | 12/2020 | Abe | A63F 13/5252 |
| 2021/0046388 A1 | 2/2021 | Schwarz et al. | |

OTHER PUBLICATIONS

Khan, Mohammed, "Generating Video Clip of Computer Simulation from Multiple Views", file history of related U.S. Appl. No. 16/917,361, filed Jun. 30, 2020.

Khan, Mohammed, "Modifying Computer Simulation Video Template Based on Feedback", file history of related U.S. Appl. No. 16/917,242, filed Jun. 30, 2020.

Khan, Mohammed, "Generating Video Clip of Computer Simulation from Multiple Views", related U.S. Appl. No. 16/917,361, Non-Final Office Action dated Dec. 22, 2021.

Khan, Mohammed, "Generating Video Clip of Computer Simulation from Multiple Views", related U.S. Appl. No. 16/917,361, Applicant's response to Non-Final Office Action filed Mar. 21, 2022.

Khan, Mohammed, "Modifying Computer Simulation Video Template Based on Feedback", related U.S. Appl. No. 16/917,242, Applicant's response to Non-Final Office Action filed Mar. 21, 2022.

Khan, Mohammed, "Modifying Computer Simulation Video Template Based on Feedback", related U.S. Appl. No. 16/917,242, Final Office Action dated May 11, 2022.

* cited by examiner

SELECTION OF VIDEO WIDGETS BASED ON COMPUTER SIMULATION METADATA

FIELD

The application relates generally to selecting video widgets based on computer simulation metadata.

BACKGROUND

Computer simulations such as computer games frequently generate metadata during game play. The metadata describes what is happening in the game, e.g., weapons used, ammunition remaining, what actions the characters take, audio, video aspects, etc.

SUMMARY

As understood herein, metadata from a computer game may be used to select a video template for a gamer that the gamer can use to generate a video. Each template can be associated with its own unique text, audio, overlays, and the like, in other words, its own style, which depends on the metadata collected during the course of game play.

Accordingly, in one aspect a device includes at least one processor programmed with instructions to identify metadata generated by play of a computer game. The instructions are executable to, based at least in part on the metadata, identify at least one widget for provision to a user device. The widget is operable to present metadata in a video template comprising at least a first template portion or change an association between features of the template and the metadata, or both.

In examples, the widget is operable to present metadata in the video template, the video template is a first video template, the widget is a first widget, and the metadata is first metadata, and the instructions are executable to identify second metadata generated by play of a computer game. The instructions are executable to, based at least in part on the second metadata, identify a second widget for provision to a user device. The second widget is operable to present at least some of the second metadata in a second video template. The metadata can include, by way of example, weapon efficiency or weapon use.

In examples in which the widget is operable to change the association between features of the template and the metadata, the widget can include at least one slider. In these examples the widget can be operable to a first configuration, in which a first portion of the video template is defined by the metadata, and can be further operable to a second configuration, in which a second portion of the video template is defined by the metadata. For example, the first configuration can provide a generic video template that is not defined by the metadata and the second configuration can provide a video template configured according to the metadata.

The widget may be operable to search for clips similar to a video clip presented by the video template, vary a length of a video clip presented by the video template, or vary an intensity of action used to select a video clip presented by the video template.

In another aspect, a device includes at least one processor programmed with instructions to identify at least one video clip of a game play video. The instructions are executable to use at least one video template received from a system server to present the video clip, and to provide at least one widget in the video template.

The widget may be operable to present metadata in the video template, with the metadata being generated during play of a computer game. Or, the widget may be operable to change an association between features of the video template and metadata generated during play of a computer game, search for clips similar to a video clip presented by the video template, vary a length of a video clip presented by the video template, vary an intensity of action used to select a video clip presented by the video template, or determine whether a generic or special video template is provided, or combinations of the above.

In another aspect, a method includes using computer game metadata to select a video widget for delivery to a user and populating a video template with at least some of the metadata and a video of the player or the game.

The details of the present application, both as to its structure and operation, can best be understood in reference to the accompanying drawings, in which like reference numerals refer to like parts, and in which:

DETAILED DESCRIPTION

Figure 1:
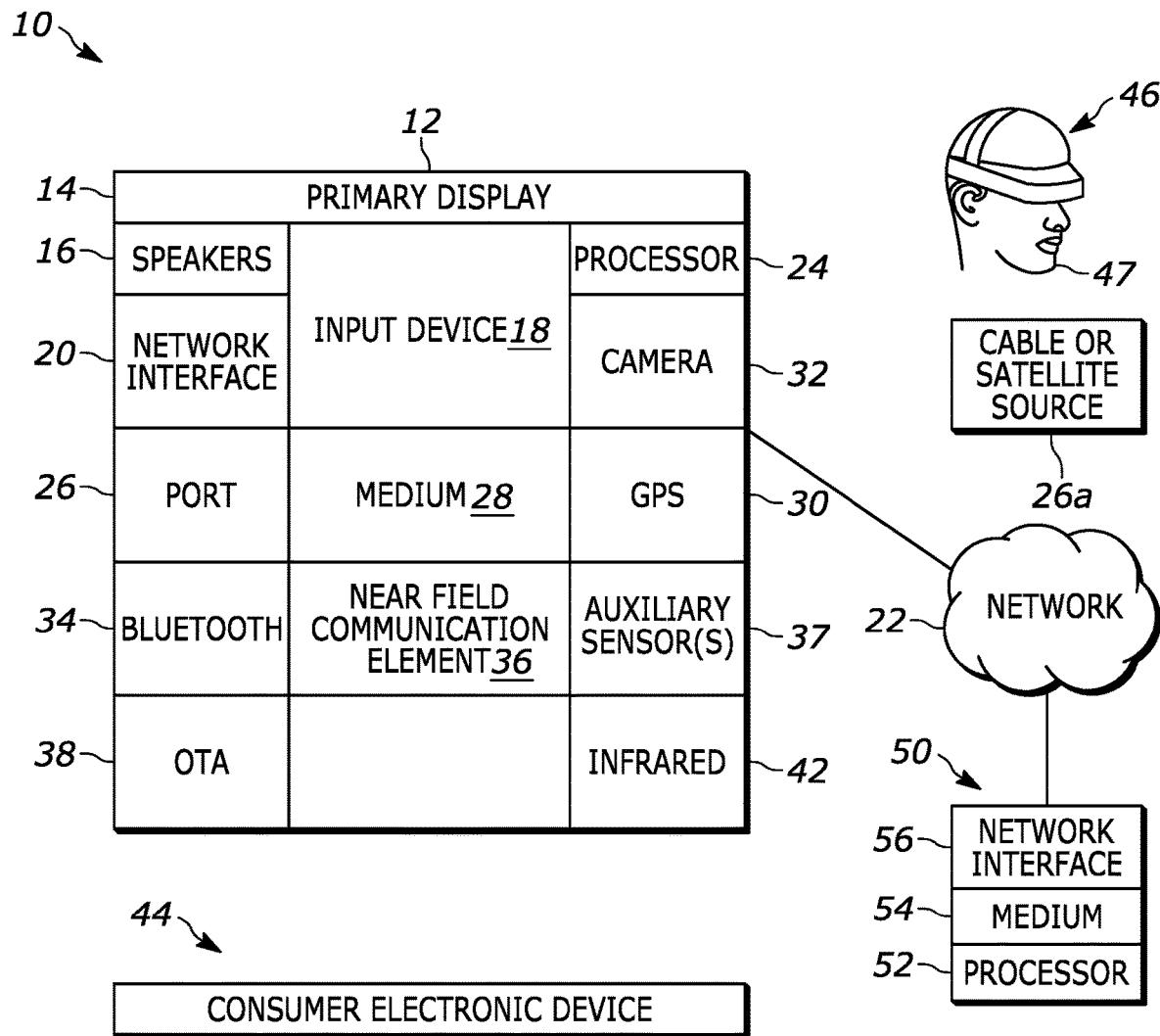
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input ports 26 such as a high definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or, the source 26a may be a game console or disk player containing content. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimensions.

Continuing the description of the AVD 12, in some embodiments the AVD 12 may include one or more cameras 32 that may be a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12.

Still referring to FIG. 1, in addition to the AVD 12, the system 10 may include one or more other CE device types. In one example, a first CE device 44 may be a computer game console that can be used to send computer game audio and video to the AVD 12 via commands sent directly to the AVD 12 and/or through the below-described server while a second CE device 46 may include similar components as the first CE device 44. In the example shown, the second CE device 46 may be configured as a computer game controller manipulated by a player or a head-mounted display (HMD) worn by a player 47. In the example shown, only two CE devices 44, 46 are shown, it being understood that fewer or greater devices may be used. A CE device herein may implement some or all of the components shown for the AVD 12. Any of the components shown in the following figures may incorporate some or all of the components shown in the case of the AVD 12.

Now in reference to the afore-mentioned at least one server 50, it includes at least one server processor 52, at least one tangible computer readable storage medium 54 such as disk-based or solid state storage, and at least one network interface 56 that, under control of the server processor 52, allows for communication with the other devices of FIG. 1 over the network 22, and indeed may facilitate communication between servers and client devices in accordance with present principles. Note that the network interface 56 may be, e.g., a wired or wireless modem or router, Wi-Fi transceiver, or other appropriate interface such as, e.g., a wireless telephony transceiver.

Accordingly, in some embodiments the server 50 may be an Internet server or an entire server "farm", and may include and perform "cloud" functions such that the devices of the system 10 may access a "cloud" environment via the server 50 in example embodiments for, e.g., network gaming applications. Or, the server 50 may be implemented by one or more game consoles or other computers in the same room as the other devices shown in FIG. 1 or nearby.

Figure 2:
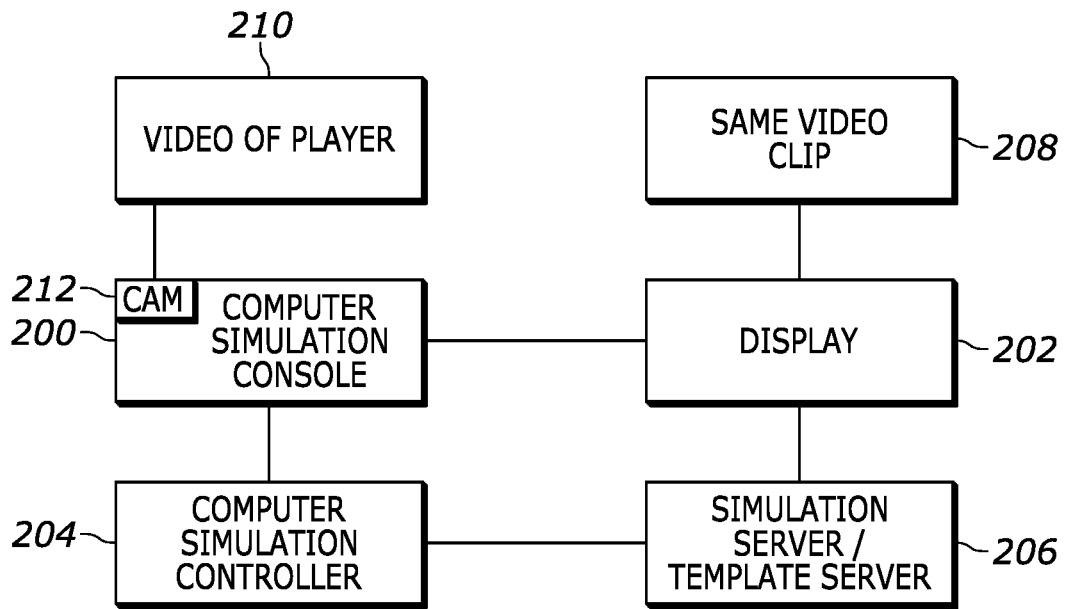
FIG. 2 is a block diagram of an example computer game system.

FIG. 2 illustrates an example computer simulation console 200 such as a Sony PlayStation® brand console that provides computer game video and audio for presentation on a display device 202 under control of one or more game controllers 204. In addition, or alternatively the computer game video may be provided by one or more network servers 206 under control of, e.g., the controller 204. A clip 208 of the game video ("gameplay") presented on the display 202 may be recorded for the user's use as described further herein. Likewise, a clip 210 of, for example, the user in his role as player or gamer may be generated by a camera 212 that may be part of the console 200, simulation controller 204, or other device.

Figure 3:
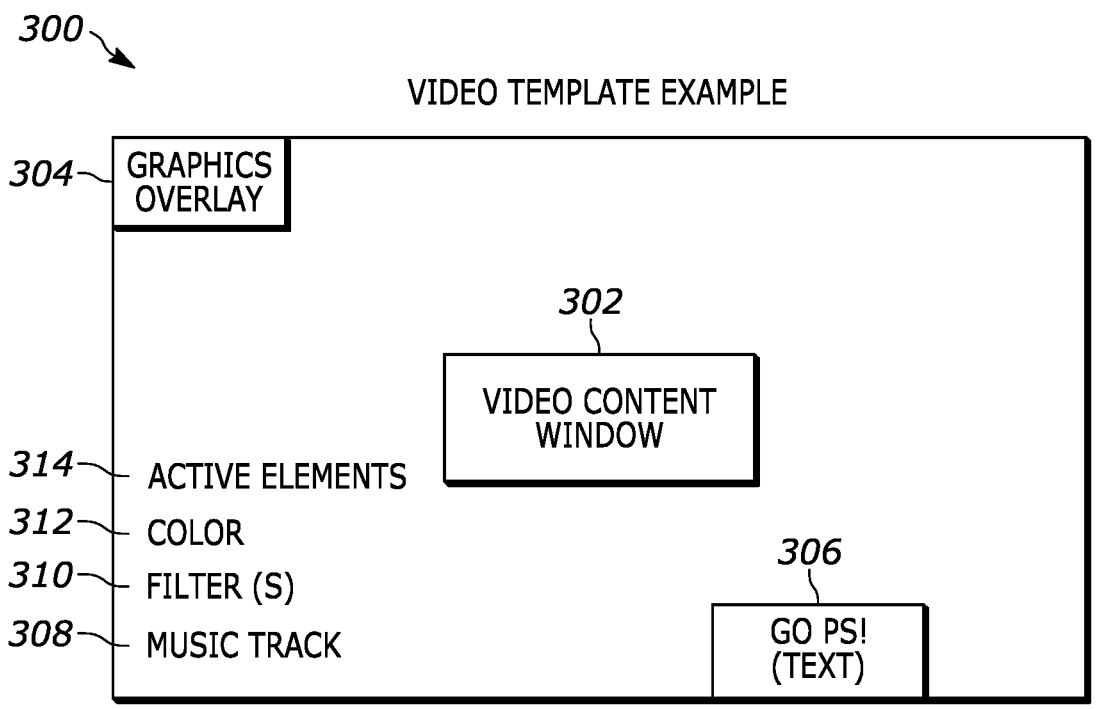
FIG. 3 illustrates an example video template.

FIG. 3 illustrates a video template 300 to facilitate a simple interface to create short form videos (for example, up to sixty minutes but typically shorter, e.g., fifteen seconds) such as the clips 208, 210 shown in FIG. 2. As recognized herein, such clips are perfect for messages and quick consumption. The template 300 provides a way to create short form, easy-to-edit, viral videos. The template 300 may be delivered via a custom online service.

As shown in FIG. 3, the template 300 includes a region 302 with which the video clip itself may be associated, along with added effects. These effects can include one or more graphics overlays 304 which may be separate from the region 302 or overlaid onto the region 302, as wells as text 306, music 308, and filters 310 to quickly make a video clip that is ready to share. A template 300 may also be characterized by a color scheme 213 and may include active elements 314 such as selector buttons and the like that can be selected to surface information, such as game data (e.g., weapon load). An active element 314 may be established by a hyperlink to a web page containing the data, which may list additional data to "surface" it.

The template 300 may reflect a current internet meme or trend that a game designer can create and post on, e.g., the server 206 shown in FIG. 2 or the clip server discussed further herein. Players can connect to the server and pull down any new template. Templates can be seasonal or temporal in nature, so people can only use them while they are available.

Figure 4:
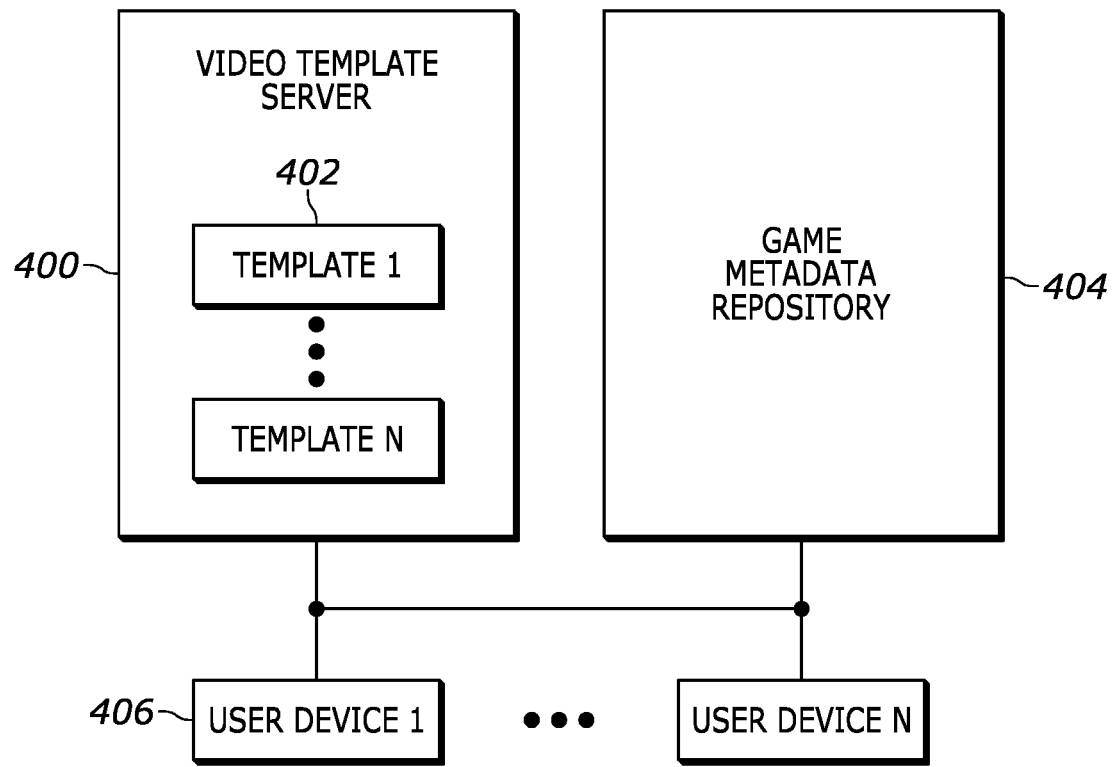
FIG. 4 is a block diagram of a video template server and game metadata repository.

As discussed in detail herein, templates 300 may be provided based on game metadata. That is, depending on the metadata describing game play, a particular template from a group of templates may be provided to the player for purposes of making a clip. FIG. 4 illustrates further.

A video template server 400 may include multiple templates 402. A data store may establish a game metadata repository 404. User devices 406 (such as computer game components) may provide gameplay metadata to the repository and receive one or more templates 402 based on the metadata.

Figure 5:
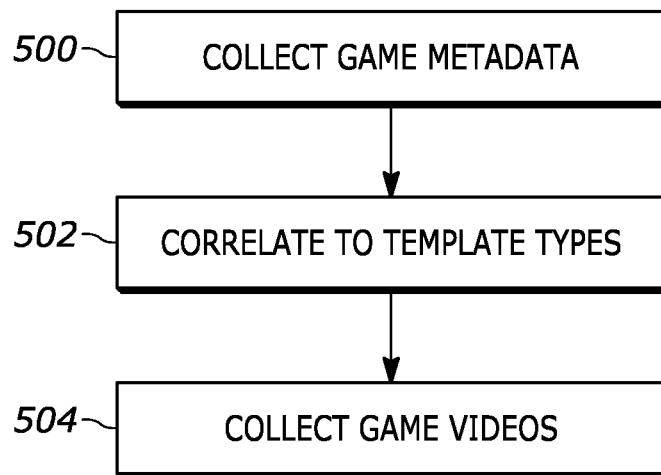
FIGS. 5-7 illustrate example logic in example flow chart format consistent with present principles.

FIG. 5 illustrates the logic discussed above, which may be executed by any of the computing devices described herein. Commencing at block 500, during game play metadata is collected. The metadata is generated during game play by the actions players take, and the metadata indicates those actions as well as automated game action such as background presentation. For example, the metadata typically describes time and nature of weapon use and the outcome (hit or miss), as well as background information such as color scheme. The metadata may also indicate player scores and other statistics such as progress in improving game play. Metadata also can include score over time and whether a player wins by coming from behind, wins being in the lead the entire game, "boss kills" (i.e., success against formidable players), etc. These are non-limiting examples of information that game play metadata can carry.

Proceeding to block 502, the game metadata is correlated to video template types. Thus, for example, a first set of metadata (indicating a quiet game for example being played by unskilled players) may be correlated to a first template type or style while a second set of metadata (indicating a violent game for example being played by skilled players) may be correlated to a second template type or style. The first template type may include soothing audio, encouraging text, one or more tunable widgets (described further below), and cool-colored graphics overall with which the generate a video clip using video from the game play whereas the second template type may include frenetic audio, exhorting text, widgets, and hot-colored graphics overall with which the generate a video clip. The user selects a clip and in return receives a particular template to construct a consolidated clip including audio, overlays, text, etc. Examples of specific template styles include a joke template or a stylized rivalry style.

Block 504 indicates that videos of the game play (and/or the user) also are collected and correlated with the metadata. Clips of the game play such as exciting periods of the play are derived from these videos. Thus, metadata generated as the video is generated is saved, so users can associate the metadata with video. Users may be informed can create videos using the template(s) for sharing either in the game system only or general public sharing over the Internet. The above-mentioned overlays thus may be URLs or links through a game system client app running on a mobile device or game console.

Figure 6:
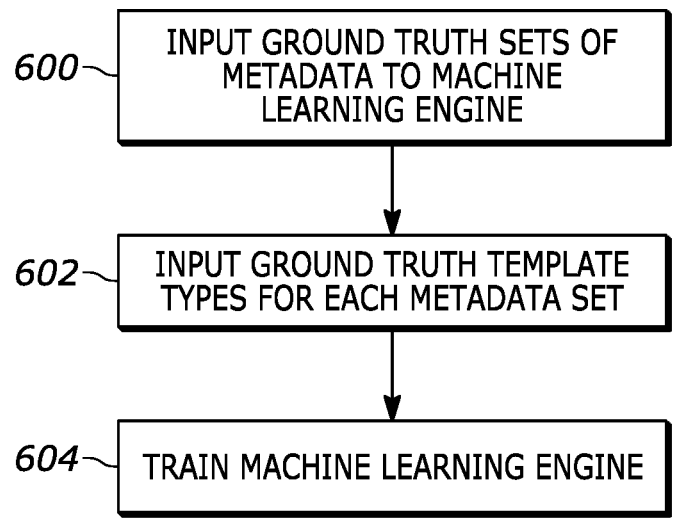
Figure 7:
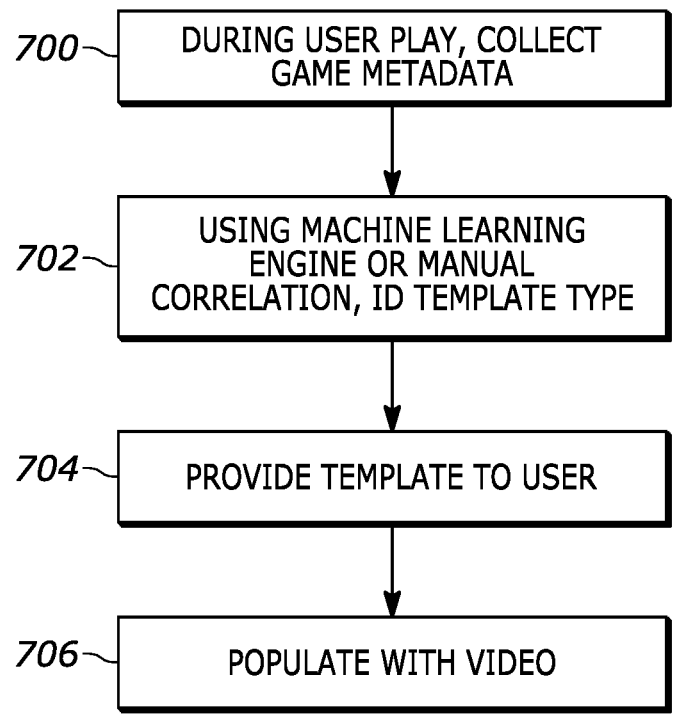

The above correlation of metadata to template type or style may be done manually by game developers. FIGS. 6 and 7 illustrate an alternate method for correlating metadata to template type or style using machine learning (ML) engines, including neural networks. Commencing at block 600 in FIG. 6, ground truth sets of metadata are input to the ML engine. Block 602 indicates that an accompanying ground truth template for each metadata set also is input to the ML engine, which trains on the ground truth at block 604.

During game play, at block 700 in FIG. 7 game metadata is collected as it is generated. Moving to block 702, the ML engine correlates the metadata to a template. As indicated above, the correlation may also be done manually. The template is then made available to the user/player at block 704, who uses it by selecting a video clip of the game play at block 706 to be presented in the template.

Figure 8:
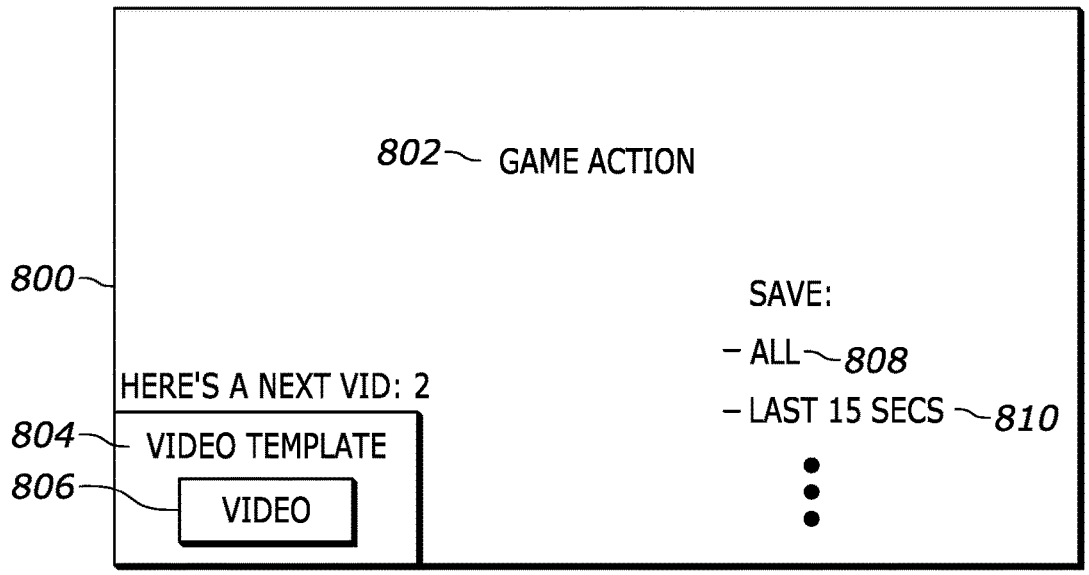
FIGS. 8 and 9 are screen shots illustrating example video templates.

FIG. 8 illustrates a user interface that may be presented on a display 800 such as any display described herein for automatically generating a video clip using a video template selected as described above. Game action 802 is presented along with a video template 804 that has been identified based on the metadata generated during game play. A video clip 806 has been automatically selected based on selection criteria and presented using the template 804 as shown. The player may be prompted to select at 808 to save the entire clip or may select at 810 to save only the most 15 seconds of the clip or may select other segments to save. Non-limiting selection criteria may include: a video of the entire game play, a video of the most action-packed sequence as indicated by, e.g., motion vectors or histogram analysis, a video of the segment during which boss kills occurred, a video of sequences in which high amounts of weapons discharged occurred, etc.

Figure 9:
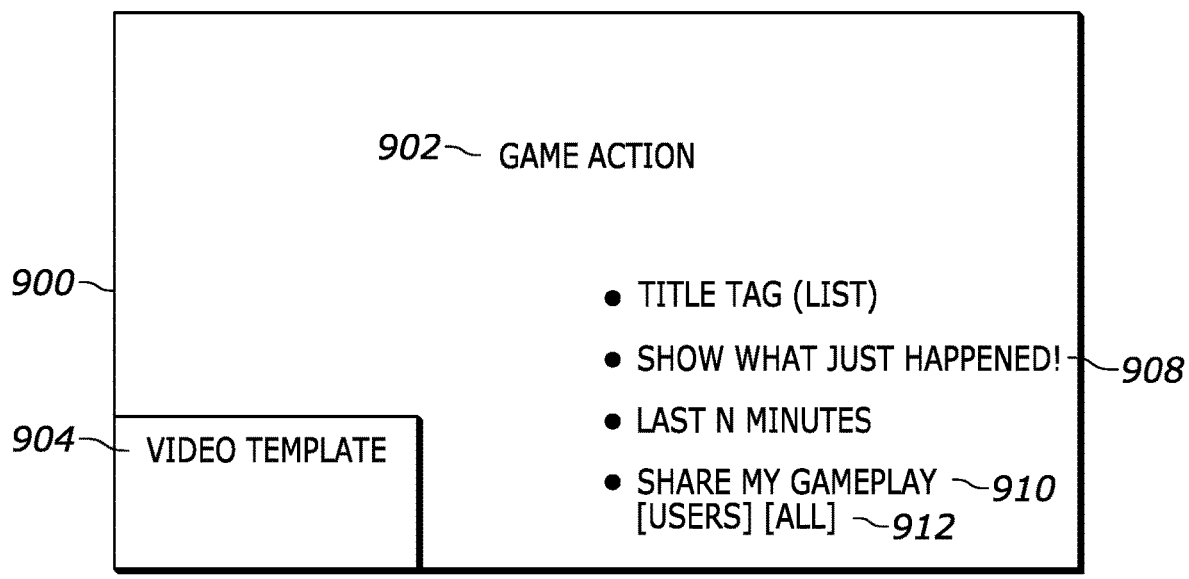

FIG. 9 illustrates a UI that may be presented on a display 900 to allow a user to select the clip of game play 902 to be presented using a video template 904. The UI may include a filed 906 into which a user can enter a title and one or more selectors 908 to identify what part of the game play video to use for the clip in the template 904. The selectors may, without limitation, include "show what just happened", "show the last N minutes", etc.

The user also may be prompted at 910 to identify whether he wants to share the video clip and may be presented with selectors 912 identifying who he wants to share the clip with, e.g., "all players in system", specific users, etc.

Figure 10:
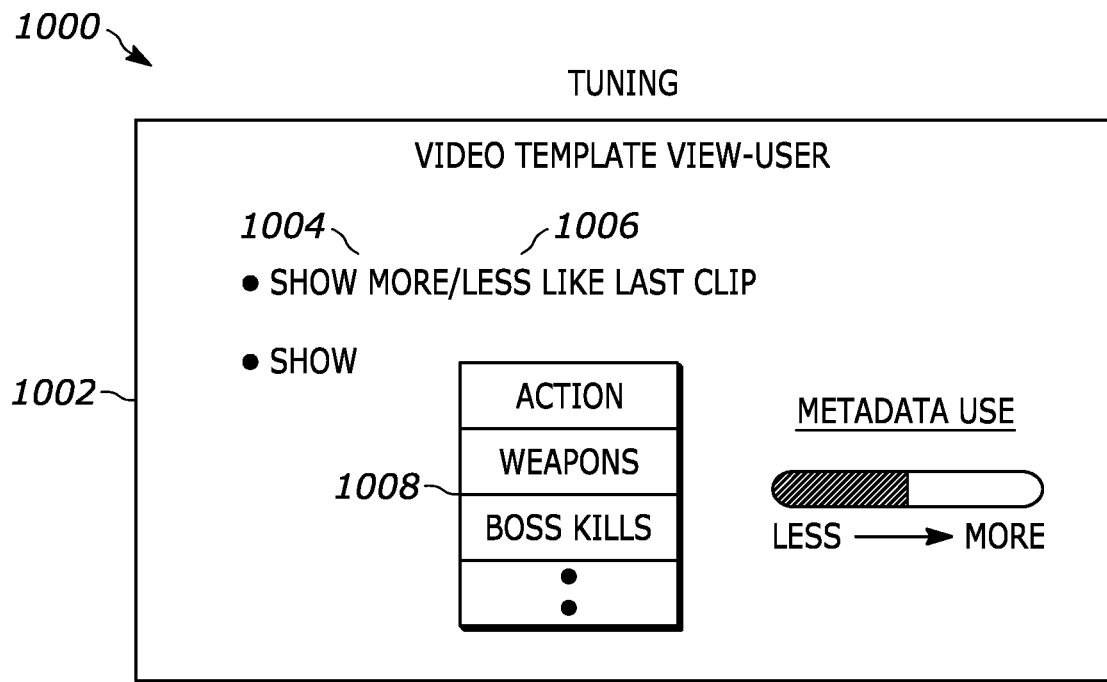
FIGS. 10 and 11 illustrate example video templates.

FIG. 10 illustrates further principles contemplated herein. A video template user interface (UI) 1000 is presented on a display 1002 such as any of the displays described herein. A first selector 1004 may be presented to enable the user to command the executing processor to show more clips that are similar to a last-selected clip. A second selector 1006 may be presented to enable the user to command the executing processor to show more clips that are dissimilar to the last-selected clip.

A widget 1008 may be presented allowing the user to select to present various metadata. For example, in the embodiment shown the widget 1008 may allow the user to select to present, along with the video clip, an action summary, a weapons load out, a number of boss kills, etc. to thereby "surface" parts of the metadata with which the video template is associated.

Additionally, a tuning widget 1010, in the example shown, a slider, can be presented and manipulated by the user to select to tune the range of control associated with the metadata, e.g., for the entire game play or only in the current scene. The user can move the slider from left to right to increase the range of control. The tuning can include searching for similar clips as indicated by metadata, shorten or lengthen the clip, increase or decrease the intensity of action used to select a clip, and increase or decrease the association between the template features and the metadata. In this last regard, selecting to decrease the association between the template features and the metadata can result in delivery of a template that is more generic while selecting to increase the association between the template features and the metadata can result in delivery of a template that is more tightly tied to the particular game play action.

Figure 11:
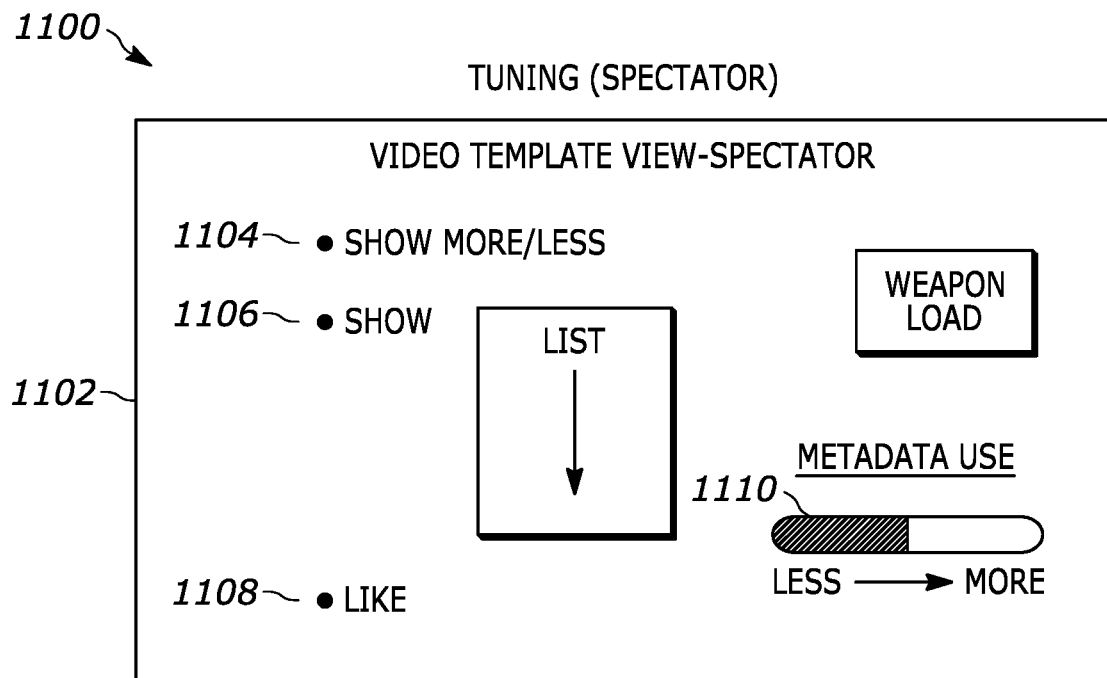

FIG. 11 illustrates a UI 1100 that may be presented on a display 1102 such as any display described herein to enable a game spectator to tune what is viewed from the spectator side. The UI 1100 may include a selector 1104 to enable the spectator to have more or less video similar to the current action shown. A widget 1106 may be presented to allow the spectator to surface metadata associated with the game being spectated, such as weapon use, etc. A like selector 1108 may be presented to allow the spectator to indicate whether the game is liked, with a signal being provided to, e.g., a game server indicating a like (or dislike). Also, a tuner 1110 may be presented to enable the spectator to tune metadata as described above in reference to FIG. 10.

Figure 12:
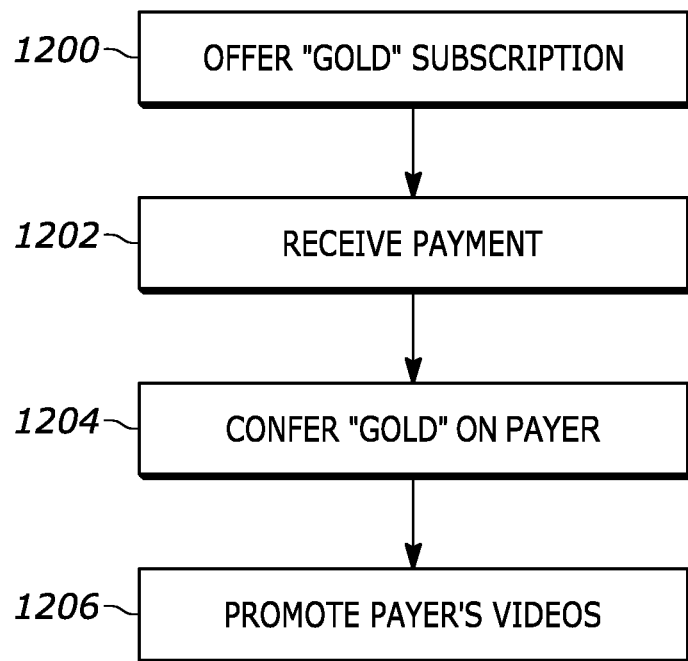
FIG. 12 illustrates example logic in example flow chart format consistent with present principles.

FIG. 12 illustrates further principles for building a sharing community by promoting the community and good community behavior such as liking, promoting other content creators, and participating in community challenges. Commencing at block 1200, good community members can be offered "Gold" status that they can give out to other creators of good videos. User accepting Gold status may be remunerated at block 1202 or equivalently may pay for gold status at block 1202 to be conferred gold status at block 1204. Block 1206 indicates that by purchasing a subscription to the "Gold" status, videos of the Gold user can be promoted in the game system to get more attention and be given as a gift to other creators.

Figure 13:
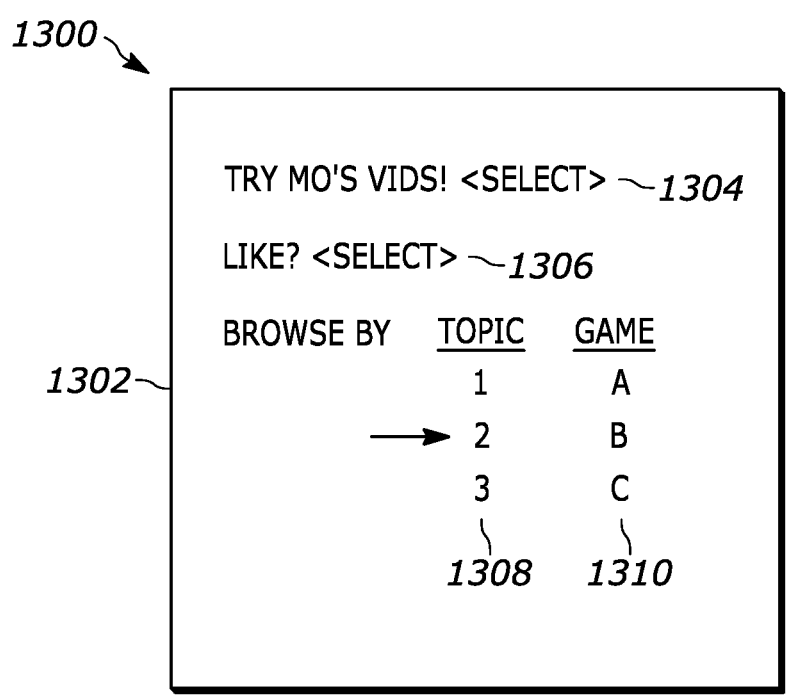
FIGS. 13-15 are screen shots of example user interfaces (UI) consistent with present principles.

FIG. 13 illustrates. A UI 1300 is presented on a display 1302 such as any display described herein to enable a user to select at 1304 to browse videos of a Gold user Mo. The user can select to like or dislike the gold user or the associated videos using a selector 1306. The user may be presented lists 1308, 1310 to browse the Gold user's videos by topic or game title.

Figure 14:
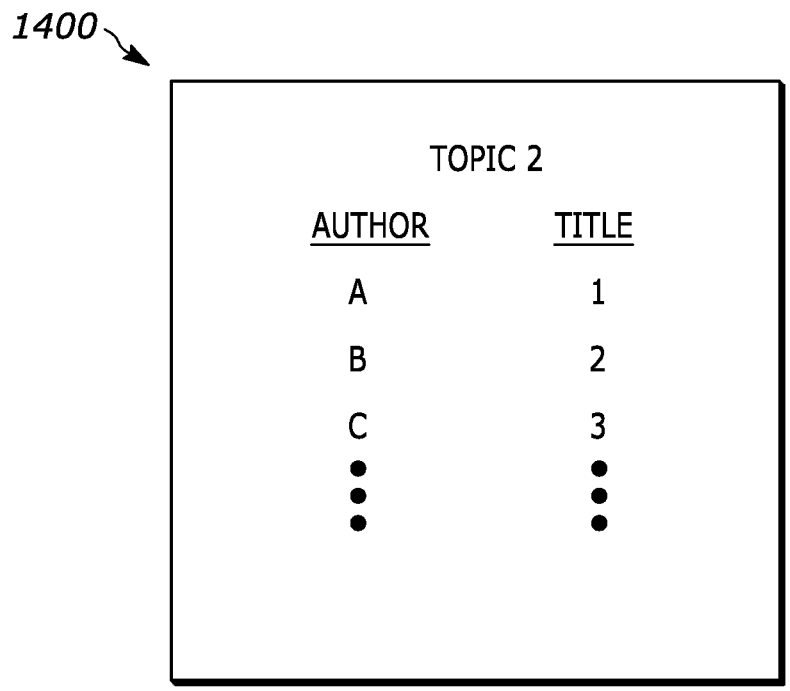

In FIG. 13 the user has selected to browse Mo's videos by topic #2. This can bring up a UI 1400 as shown in FIG. 14 listing by author and title Mo's videos in topic #2. The user can select one of the videos to view it.

Figure 15:
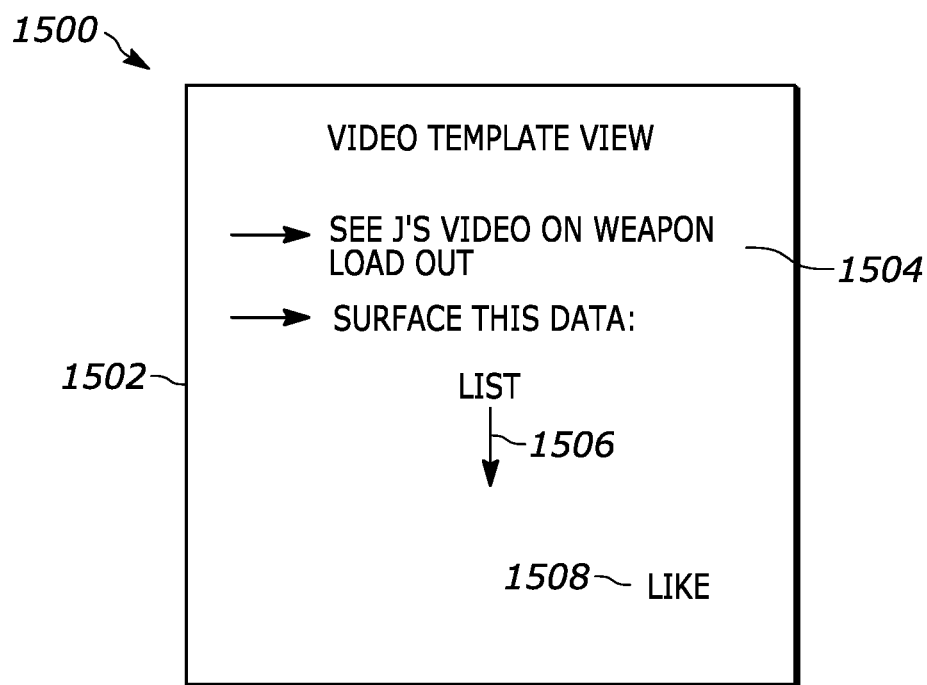

FIG. 15 illustrates a video template UI 1500 that can be presented on a display 1502 such as any display described herein to enable a user to watch videos created by other users and upvote the ones that are liked. Accordingly, the UI 1500 may include a prompt 1504 to view another user's video on weapon load out, in this case, user "J". The UI 1500 may include a list 1506 with entries that can be selected to surface data indicated in the list. A like selector 1508 may be provided to enable a user to indicate whether the video is liked.

Accordingly, the preceding figures disclose a method of watching videos by browsing channels by topic or game. A method for watching video clips can be a continuous stream of videos that can be quickly watched or skipped, with highest rated content or curated content being shown more than other content. Game play data can be overlaid on top of the video to enhance the experience.

Figure 16:
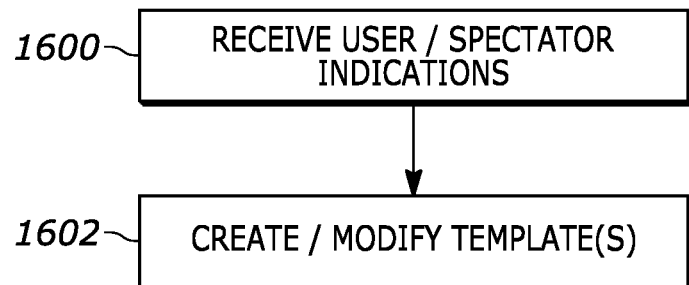
FIG. 16 illustrates example logic in example flow chart format consistent with present principles.

FIG. 16 illustrates that user and spectator indications of "like" and "dislike" can be received at block 1600 and used at block 1602 to modify video clip templates and/or to create new templates. Thus, with feedback, player preferences can be learned, and templates changed accordingly. For example, if feedback indicates that users like long range kills, such kills are subsequently search out for and templates accordingly made or modified.

Figure 17:
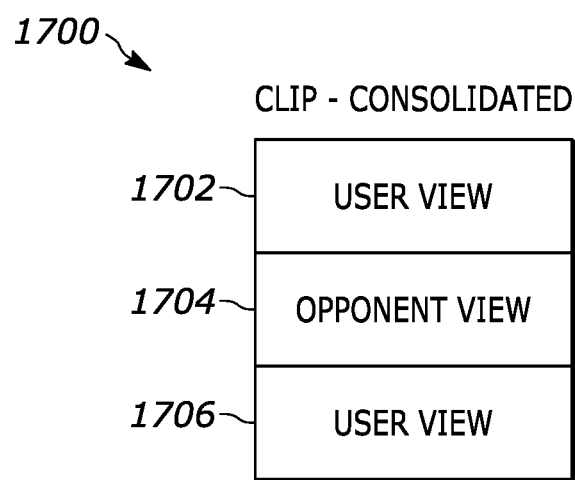
FIG. 17 illustrates and example video clip.

Present principles further understand that it may be interesting to incorporate opponent view video in a player's video clip, and that a user should be given the opportunity to share (opt in) his videos with opponents by, e.g., uploading his game play videos to the cloud to facilitate subsequent manual editing by other (more expert) users or generation of automatic video recap using all views. FIG. 17 illustrates.

A game play video clip 1700 is shown in FIG. 17 with multiple segments. A first segment 1702 includes a short clip from the user's recorded game play, e.g., from time 1 to time 2. A second segment 1704 immediately temporally following the first segment 1702 includes a short clip from the recorded game play of the user's opponent, e.g., from time 2 to time 3. A third segment 1706 immediately temporally following the second segment 1704 includes a short clip from the recorded game play of the user, e.g., from time 3 to time 4.

Figure 18:
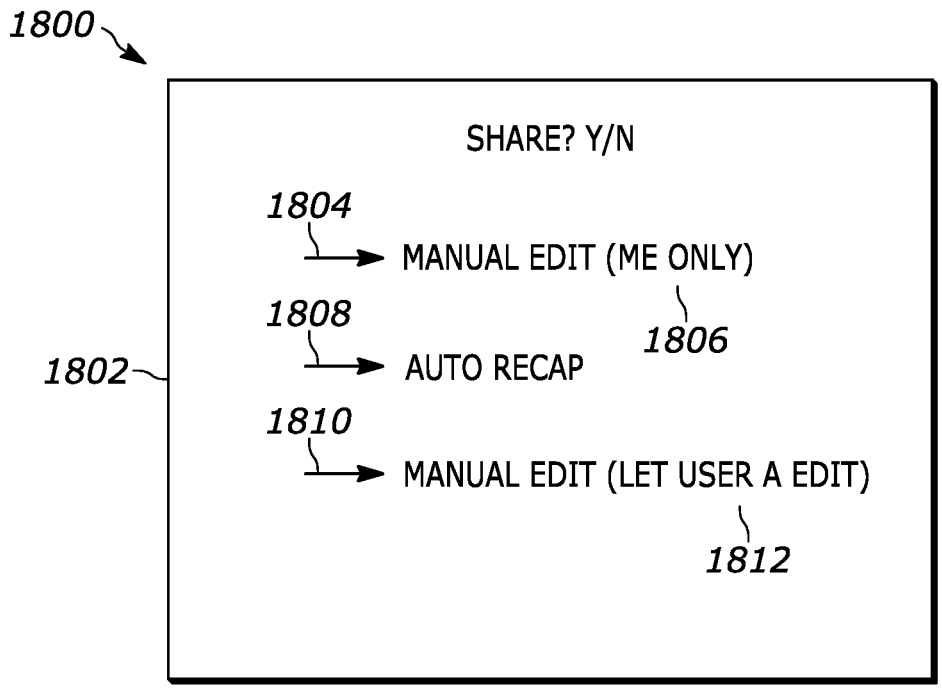
FIG. 18 is a screen shot of an example UI consistent with present principles.

FIG. 18 illustrates a UI 1800 that can be presented on a display 1802 such as any display described herein to generate the clip 1700 shown in FIG. 17. The UI 1800 can include a manual edit selector 1804 to allow manual editing of game play video to generate a clip. The UI 1800 also may include a selector 1806 to allow a user to limit editing to only himself.

Additionally, the UI 1800 may include an auto recap selector 1808 to allow a user to select to have the associated processor automatically construct a video clip from portions of game play video. The UI 1800 also may include a manual edit selector 1810 indicating that another user (in the example shown, user A) has the right to edit the selecting user's game play video to generate the clip 1700 shown in FIG. 17.

Figure 19:
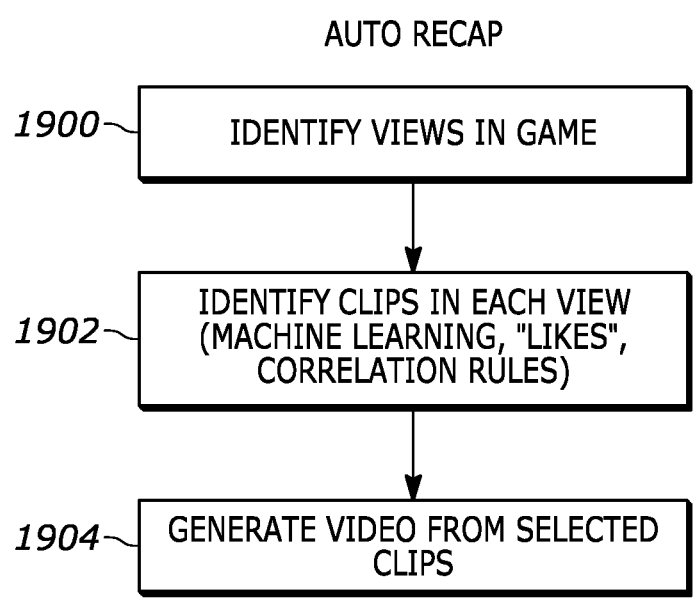
FIG. 19 illustrates example logic in example flow chart format consistent with present principles.

FIG. 19 illustrates generating a clip such as the clip 1700 in FIG. 17 automatically by recapping the game play. Commencing at block 1900 the various views are identified in the game. The views may include a user view, a view of one or more opponents of the user, and a view of one or more spectators of the game.

Proceeding to block 1902, clips are identified in each view that are to be used to generate the overall clip 1700 in FIG. 17. This identification may be done by a ML engine trained using ground truth sets of "interesting" clips, or by selecting the "N" clips with the highest number of like generated during recording of the clip, or using heuristic correlation rules, e.g., select all clips with boss kills, select all clips with weapons discharges, etc. The overall video clip 1700 in FIG. 17 may then be generated at block 1904 using the clips identified in block 1902, preferably in seamless temporal sequence.

Figure 20:
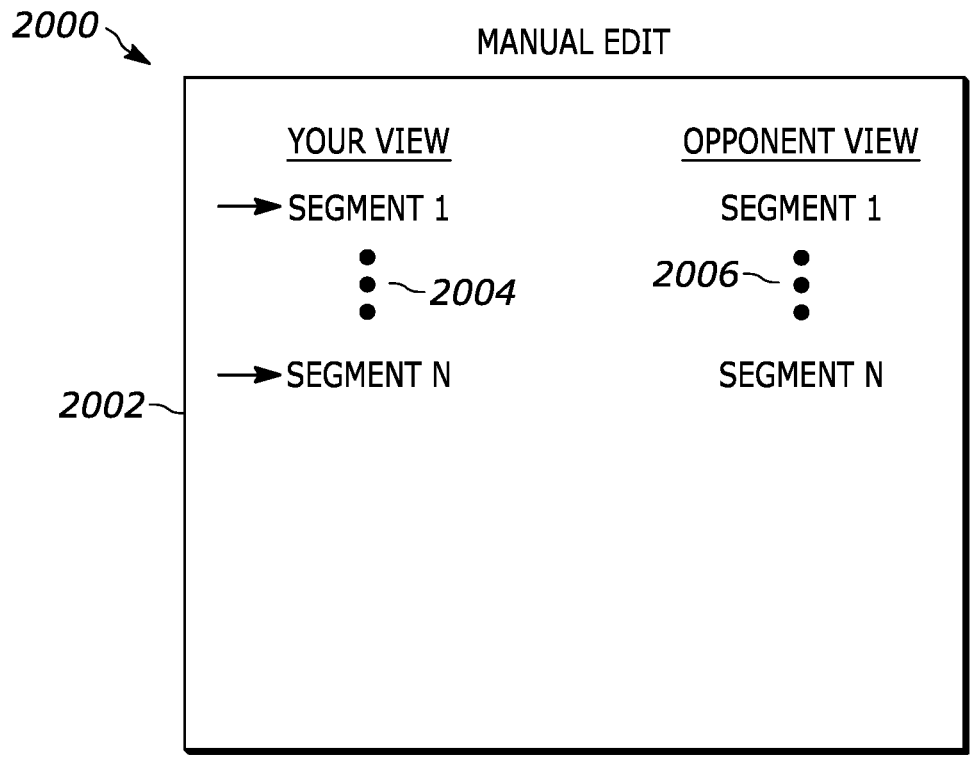
FIGS. 20-22 are screen shots of example user interfaces (UI) consistent with present principles.

FIG. 20 illustrates a UI 2000 that can be presented on a display 2002 such as any display described herein to manually generate the clip 1700 shown in FIG. 17. In FIG. 20, a list 2004 in temporal sequence is presented of segments from the user's game play video that may be selected to be part of the overall clip 1700 in FIG. 17. Likewise, a corresponding list 2006 in temporal sequence is presented of segments from the game play video of the opponent of the user that may be selected to be part of the overall clip 1700 in FIG. 17.

Figure 21:
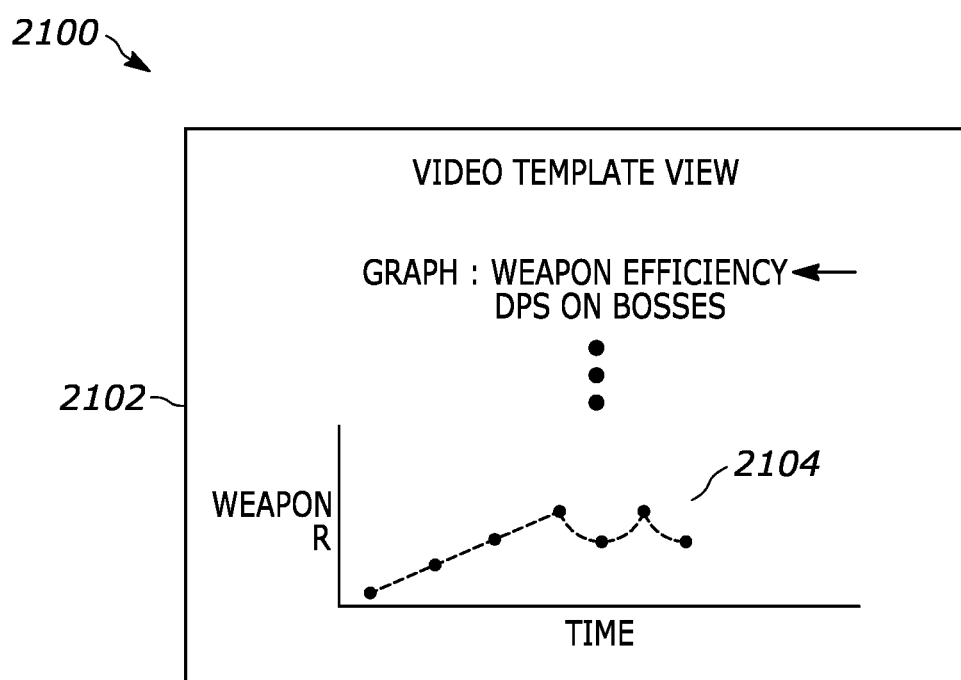

FIG. 21 illustrates a video template UI 2100 that can be presented on a display 2102 such as any display described herein. The UI 2100 illustrates that a video template widget has been used to surface a particular element of metadata as described above, in the example shown, a graph 2104 of weapon efficiency over time such as damage per second (DPS) on "bosses". The graph 2104 can be overlaid on the video clip. Note that interpolation may be used between data points in the graph 2104 to fill in holes between frames. A "life meter" also may be presented in the video template and overlaid on the game play clip.

Data may be streamed to game in a particular a format/data model, and unique codes may be added to tag what is being viewed. Thus, a tagging system can be established in which a user/player select from a list of tags when creating/sharing videos to influence where the videos are shown in the video player. For example, a particular video may be created and tagged as a "Tutorial". Or, the video may be tagged as a "WeeklyHighlightChallenge".

Figure 22:
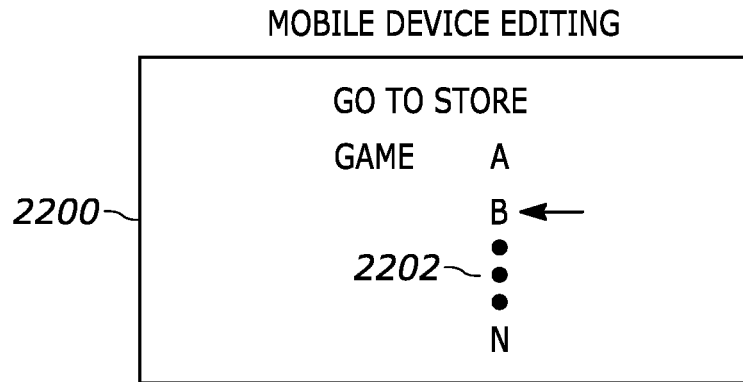

FIG. 22 illustrates principles of collaborative editing and mobile editing to edit gameplay videos via the cloud on a mobile device 2200. As described above, users can save their game play video captures to the cloud, i.e., to a system server. Once the videos are in the cloud, a mobile version of logic above presents a list 2202 or other data structure on the mobile device 2200 from which the user pulls/streams content from the cloud to allow easy editing on the mobile device 2200.

Figure 23:
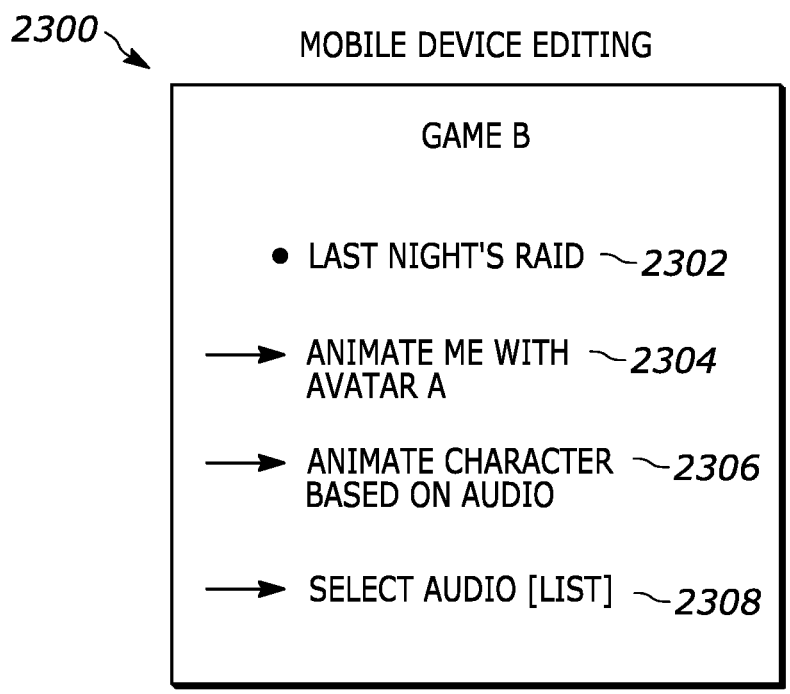
FIG. 23 is a screen shot of an example mobile device UI for editing.

FIG. 23 illustrates this further. Since the game play video captures are saved on the cloud and game play data is available from the game system users can employ a UI 2300 on the mobile device to find and share videos based on activities 2302 (in the example shown, "last night's raid"). The selected activity can then be edited using videos from each perspective of the team members in the "raid" or other activity.

FIG. 23 illustrates further editing features. Masks/avatars can be based on camera capture or based on audio only. Masks may be used to obscure the players' faces for their picture in picture video narrations or for use in quick/funny messages. A mask or avatar may be animated on top of the user image from the camera by selecting the selector 2304. Another selector 2306 may be selected to animate a character model based on the audio captured during game play. The audio may be selected from a list 2308. Based on the tone, energy levels of the voice recording, and so on the character model's mouth and expressions (like anger, or laughter) can be animated.

Figure 24:
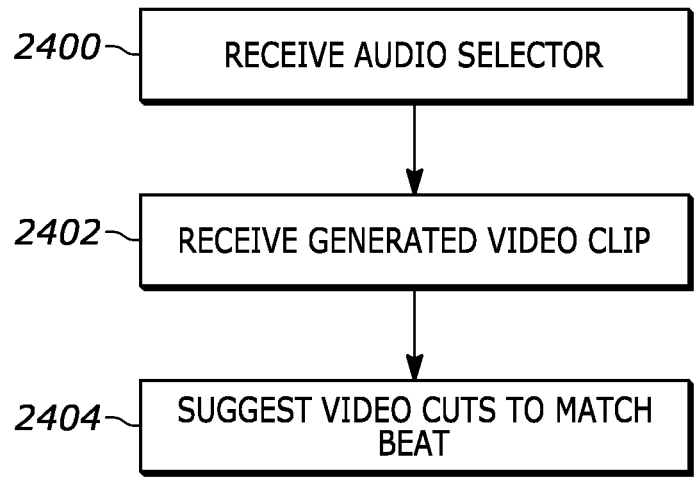
FIGS. 24 and 25 illustrate example logic in example flow chart format consistent with present principles.

FIG. 24 illustrates further. An audio selection may be received at block 2400. The game play video clip to be used is identified at block 2402, and then video cuts may be suggested at block 2404 to match the beat of the audio received at block 2400. Beat detection thus defines the optimal points for editing/cuts. Users can pick their favorite songs for use in a video montage and then the logic automatically suggests where they should place their "cuts" or edits so that the resulting video is optimally edited to the beat of the music.

Figure 25:
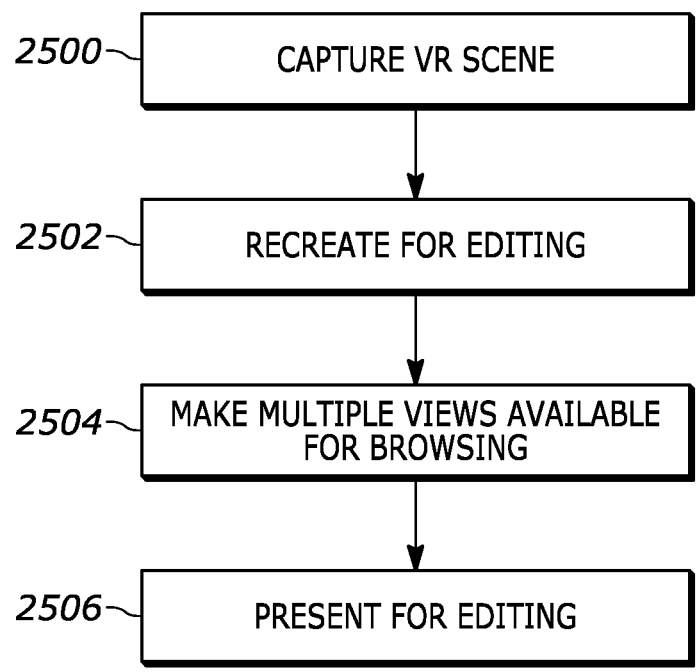
Figure 26:
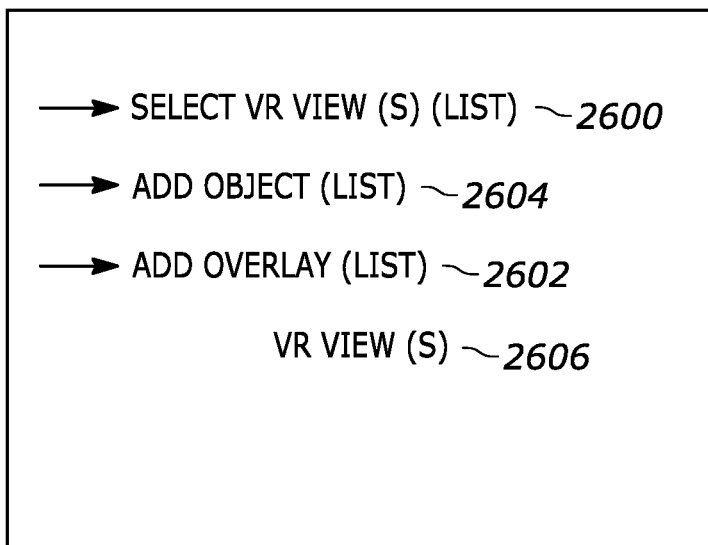
FIG. 26 is a screen shot of an example UI consistent with present principles.

FIGS. 25 and 26 illustrate principles related to editing virtual reality (VR) game play video clips. Commencing at block 2500, a VR scene is captured from the recorded game play and recreated at block 2502 for editing. A specific scene may be captured, or the entire VR game play video may be recreated, and multiple views made available at block 2504 to editors. The views are presented on one or more editor devices at block 2506 for editing consistent with principles described herein.

As shown in FIG. 26, once in the VR editing mode, editors may select VR views from a list using a selector 2600. Editors also can add overlays using a selector 2602 and objects using a selector 2604 into the scene at various levels of depth in the scene 2606.

The VR editing mode allows access to the virtual cloud and navigation through the clouds of captured game experiences. Editors can zoom back and forth between different "activities" and see multiple views of that activity.

It will be appreciated that whilst present principals have been described with reference to some example embodiments, these are not intended to be limiting, and that various alternative arrangements may be used to implement the subject matter claimed herein.

What is claimed is:

1. A device comprising:
at least one processor programmed with instructions to:
identify metadata generated by play of a computer game;
based at least in part on the metadata, identify at least one widget for provision to a user device, the widget being operable to:
present metadata in a video template comprising at least a first template portion; or
change an association between features of the template and the metadata; or
both present metadata in the video template and change the association between features of the template and the metadata, wherein the widget is operable to present metadata in the video template, the video template is a first video template, the widget is a first widget, and the metadata is first metadata, and the instructions are executable to:
identify second metadata generated by play of a computer game; and
based at least in part on the second metadata, identify a second widget for provision to a user device, the second widget being operable to present at least some of the second metadata in a second video template.

2. A device comprising:
at least one processor programmed with instructions to:
identify metadata generated by play of a computer game;
based at least in part on the metadata, identify at least one widget for provision to a user device, the widget being operable to:
present metadata in a video template comprising at least a first template portion; or
change an association between features of the template and the metadata; or
both present metadata in the video template and change the association between features of the template and the metadata, wherein the metadata comprises weapon efficiency.

3. A device comprising:
at least one processor programmed with instructions to:
identify metadata generated by play of a computer game;
based at least in part on the metadata, identify at least one widget for provision to a user device, the widget being operable to:
present metadata in a video template comprising at least a first template portion; or
change an association between features of the template and the metadata; or
both present metadata in the video template and change the association between features of the template and the metadata, wherein the metadata comprises weapon use.

4. A device comprising:
at least one processor programmed with instructions to:
identify metadata generated by play of a computer game;
based at least in part on the metadata, identify at least one widget for provision to a user device, the widget being operable to:
present metadata in a video template comprising at least a first template portion; or
change an association between features of the template and the metadata; or
both present metadata in the video template and change the association between features of the template and the metadata, wherein the widget is operable to change the association between features of the template and the metadata.

5. The device of claim 4, wherein the widget comprises at least one slider.

6. The device of claim 4, wherein the widget is operable to a first configuration, in which a first portion of the video template is defined by the metadata, the widget being further operable to a second configuration, in which a second portion of the video template is defined by the metadata, the first portion being different than the second portion.

7. The device of claim 4, wherein the widget is operable to a first configuration and a second configuration, wherein the first configuration provides a generic video template and the second configuration provides a video template configured according to the metadata.

8. A device comprising:
at least one processor programmed with instructions to:
identify metadata generated by play of a computer game;
based at least in part on the metadata, identify at least one widget for provision to a user device, the widget being operable to:
present metadata in a video template comprising at least a first template portion; or
change an association between features of the template and the metadata; or
both present metadata in the video template and change the association between features of the template and the metadata, wherein the widget is operable to search for clips similar to a video clip presented by the video template.

9. A device comprising:
at least one processor programmed with instructions to:
identify metadata generated by play of a computer game;
based at least in part on the metadata, identify at least one widget for provision to a user device, the widget being operable to:
present metadata in a video template comprising at least a first template portion; or
change an association between features of the template and the metadata; or both present metadata in the video template and change the association between features of the template and the metadata;
wherein the widget is operable to vary a length of a video clip presented by the video template.

10. A device comprising:
at least one processor programmed with instructions to:
identify metadata generated by play of a computer game;
based at least in part on the metadata, identify at least one widget for provision to a user device, the widget being operable to:
present metadata in a video template comprising at least a first template portion; or
change an association between features of the template and the metadata; or
both present metadata in the video template and change the association between features of the template and the metadata;
wherein the widget is operable to vary an intensity of action used to select a video clip presented by the video template.

11. A device, comprising:
at least one processor programmed with instructions to:
identify at least one video clip of a game play video;
use at least one video template received from a system server to present the video clip; and
provide at least one widget in the video template, wherein the widget is operable to change an association between features of the video template and metadata generated during play of a computer game.

12. A device, comprising:
at least one processor programmed with instructions to:
identify at least one video clip of a game play video;
use at least one video template received from a system server to present the video clip; and
provide at least one widget in the video template, wherein the widget is operable to search for clips similar to a video clip presented by the video template.

13. A device, comprising:
at least one processor programmed with instructions to:
identify at least one video clip of a game play video;
use at least one video template received from a system server to present the video clip; and
provide at least one widget in the video template, wherein the widget is operable to vary an intensity of action used to select a video clip presented by the video template.

14. A device, comprising:
at least one processor programmed with instructions to:
identify at least one video clip of a game play video;
use at least one video template received from a system server to present the video clip; and
provide at least one widget in the video template, wherein the widget is operable to a first configuration and a second configuration, wherein the first configuration provides a generic video template and the second configuration provides a video template configured according to the metadata.

* * * * *